United States Patent [19]
Strock et al.

[11] Patent Number: 5,620,144
[45] Date of Patent: Apr. 15, 1997

[54] STACKED INTERSPACIAL SPRAY HEADER FOR FGD WET SCRUBBER

[75] Inventors: Thomas W. Strock, Jackson Township, Stark County; Frederick L. White, Goshen Township, Mahoning County, both of Ohio

[73] Assignee: The Babcock & Wilcox Company, New Orleans, La.

[21] Appl. No.: 386,834

[22] Filed: Feb. 10, 1995

[51] Int. Cl.⁶ .................................................. B05B 1/18
[52] U.S. Cl. ........................... 239/557; 239/566; 239/565
[58] Field of Search ..................................... 239/557, 566, 239/565, 556, 548; 261/117; 95/224, 235

[56] References Cited

U.S. PATENT DOCUMENTS

| | | | |
|---|---|---|---|
| 3,518,817 | 7/1970 | Dell'Agnese | 261/117 |
| 3,887,131 | 6/1975 | Bourne | 239/557 |
| 4,315,872 | 2/1982 | Senjo | 95/224 |
| 4,760,961 | 8/1988 | Nagai | 239/566 |
| 5,173,093 | 12/1992 | Johnson | 239/557 |

Primary Examiner—Robert J. Oberleitner
Assistant Examiner—C. T. Bartz
Attorney, Agent, or Firm—Robert J. Edwards; Michael L. Hoelter

[57] ABSTRACT

An arrangement for uniformly distributing a liquid slurry across a flow path at a selected level of a housing. This invention incorporates a plurality of supply headers located adjacent the housing at that level of the housing for supplying the liquid slurry to the housing. A plurality of feeder lines extend from each of these supply headers across the flow path at this level of the housing. The feeder lines from one such supply header are arranged so as to be vertically displaced directly atop the feeder lines from an adjacent supply header. Thus, the feeder lines from the separate supply headers extend in a parallel, in-line relationship one atop the other thereby reducing the blockage of the flow path. Nozzles extend in a staggered fashion from these feeder lines and are off-set with respect to each other. The staggering of the nozzles is provided so that the spray from the nozzles coupled to the upper feeder lines do not impinge directly on the structure of the lower feeder lines.

21 Claims, 6 Drawing Sheets

PRIOR ART

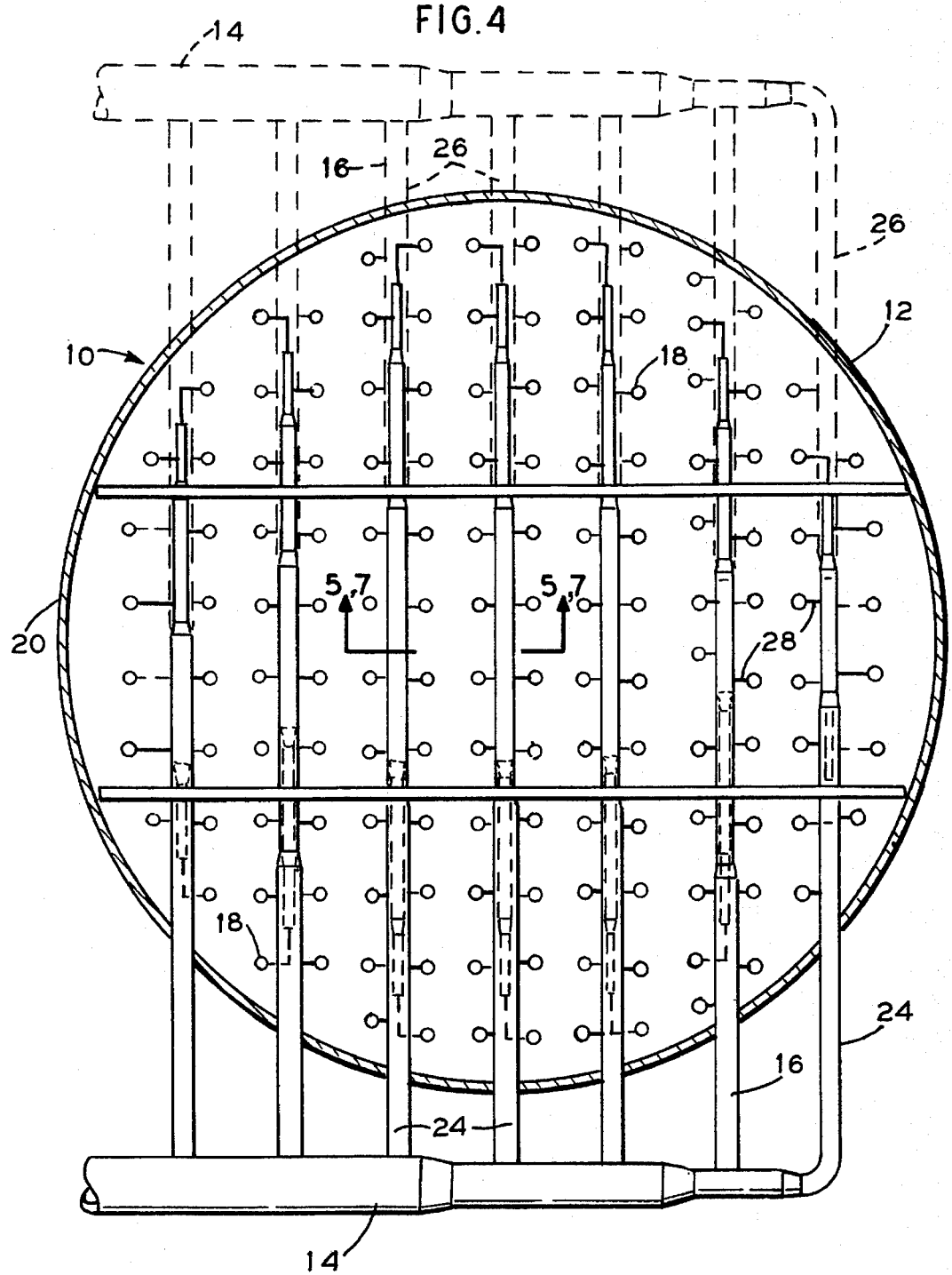

STACKED INTERSPACIAL SPRAY HEADER FOR FGD WET SCRUBBER

FIELD OF THE INVENTION

This invention pertains to wet scrubbing for contaminant or flue gas desulfurization (FGD) in general and more particularly to a header arrangement for use in contaminant removal scrubber towers.

BACKGROUND OF THE INVENTION

Generally, all contaminant removal scrubber towers include one or more spray levels that spray a reagent slurry onto the flue gas passing thereby. In most cases, this slurry is sprayed downwardly onto the counter-flowing flue gas so as to remove sulfur or other compounds from the flue gas as it flows upwardly through the tower. Of course, in other scrubber tower arrangements, the flue gas can be directed to flow downwardly or sideways through the tower which would thus necessitate the spraying of the reagent in an upwardly or a sideways manner. In any event, each spray level would generally consist of a multitude of spray nozzles that uniformly distribute the slurry about the cross section of the wet scrubber absorber tower through which the flue gas flows.

Usually, each such spray level is supplied its reagent slurry via a header arrangement that extends across the flue gas flow path. Such header arrangements oftentimes consist of a single main supply line and a multitude of individual feeder lines branching therefrom. These feeder lines further distribute or deliver the slurry to the spray nozzles, that are secured to these feeder lines, which atomize the slurry prior to being sprayed onto the flue gas. The number of nozzles and the nozzle locations are established so as to provide a uniform slurry coverage and also to provide the necessary slurry flow as required for sulfur or other contaminant removal criteria. Since practical limits exist on the flow capacity of each nozzle and the number of nozzles that can be used in a conventional spray header, multiple spray headers at various levels or elevations of the tower must be used so as to achieve the desired degree of contaminant removal. Furthermore, each spray level is supplied by an independent pumping system that itself contains redundancy so that operations may continue even though a portion of an individual pumping system may require maintenance.

An important consideration in the design of FGD scrubbers is the flue gas pressure drop through the scrubber tower. Pressure drop affects both the FGD system capital (i.e. construction) and operating costs. The wet scrubber spray headers cause a pressure drop simply by the fact that their presence in the flue gas flow path impedes such flow. Other mechanisms that affect the pressure drop in the tower include the spray nozzle pressure, flow rate, spray pattern, and nozzle spacing. Conventional spray header arrangements (i.e. one header with multiple feeder lines attached thereto) generally block approximately 22.5% of the total flue gas flow area within the tower.

Another important consideration in the design of FGD scrubbers is mist eliminator efficiency. Mist eliminators are typically chevron shaped inertial separators that remove small atomized droplets entrained in the upwardly flowing flue gas. The efficiency depends on the mist eliminator design details, flue gas velocities from the spray zone, and the quantity of mist created in the spray zone and flowing upward. This quantity of mist depends on the local gas velocities near the spray headers which depend on the flue gas flow area within the tower.

An advanced spray header arrangement recently developed by The Babcock & Wilcox Company is the interspacial spray header arrangement shown in U.S. Pat. No. 5,173,093 entitled "Single Spray Level for Flue Gas Desulfurization System." This spray header arrangement has typically two or more main supply headers located adjacent the wet scrubber tower at each level with multiple branches or feeder lines spanning across the flue gas flow path so as to supply slurry to the spray nozzles. The flow in each of these main headers is supplied by a separate pump and is roughly equivalent to the flow of a single conventional spray header. The advantage of this interspacial spray header arrangement is that it increases the number of spray nozzles and thus slurry flow at a particular level in the tower. It thus enables the tower to operate with fewer spray levels thereby reducing the height (and thus construction and operating costs) of the tower.

This interspacial spray header arrangement blocks approximately 45% of the total flue gas flow area within the tower. This increased flow blockage relative to a conventional spray header increases the flue gas pressure drop across the tower. This increased pressure drop offsets to some extent the cost savings achieved with the interspacial spray header arrangement. Also, the increased flow blockage increases the mist eliminator loading.

It is thus an object of this invention to improve upon both the conventional spray header arrangement and the interspacial spray header arrangement illustrated in U.S. Pat. No. 5,173,093. Another object of this invention is to provide a manner of increasing the slurry flow at a particular level within a scrubber tower without significantly increasing the blockage of the flue gas flow area by such a header arrangement. It is thus an object of this invention to increase the reagent slurry flow while only minimally increasing the pressure drop across the scrubber tower. Another object of this invention is to reduce the flue gas velocity in the vicinity of the spray header arrangement so that the sprayed and/or atomized slurry may be entrained for longer periods of time. Still another object of this invention is to reduce the volume of mist carried upward thereby reducing the amount of mist that must be eliminated (and also reduce its associated pressure drop) before the cleaned flue gas is discharged. Still another object of this invention is to provide for flow and atomization characteristics of the spray nozzles that are not compromised while still achieving uniform spray coverage. Yet another object of this invention is to reduce the scrubber tower height thereby reducing the capital and operating costs of such a tower.

SUMMARY OF THE INVENTION

What is disclosed is an arrangement for uniformly distributing a liquid slurry at a selected level of an elongated housing. This arrangement consists of a plurality of supply headers that are located at that level of the housing with these headers supplying the liquid slurry to the housing. A plurality of feeder lines are also secured to each of these supply headers at this level of the housing. These feeder lines are arranged so that the feeder lines from one of the supply headers are vertically disposed directly atop the feeder lines from another supply header. A plurality of connectors are coupled to each of the feeder lines and each such connector supports at least one spray nozzle therefrom. The connectors that are coupled to one of the feeder lines are staggered with respect to the connectors coupled to an adjacent vertically disposed feeder line.

BRIEF DESCRIPTION OF THE DRAWINGS

FIG. 4 is a top plan view of a header arrangement according to the present invention.

DESCRIPTION OF THE PREFERRED EMBODIMENTS

Figure 1:
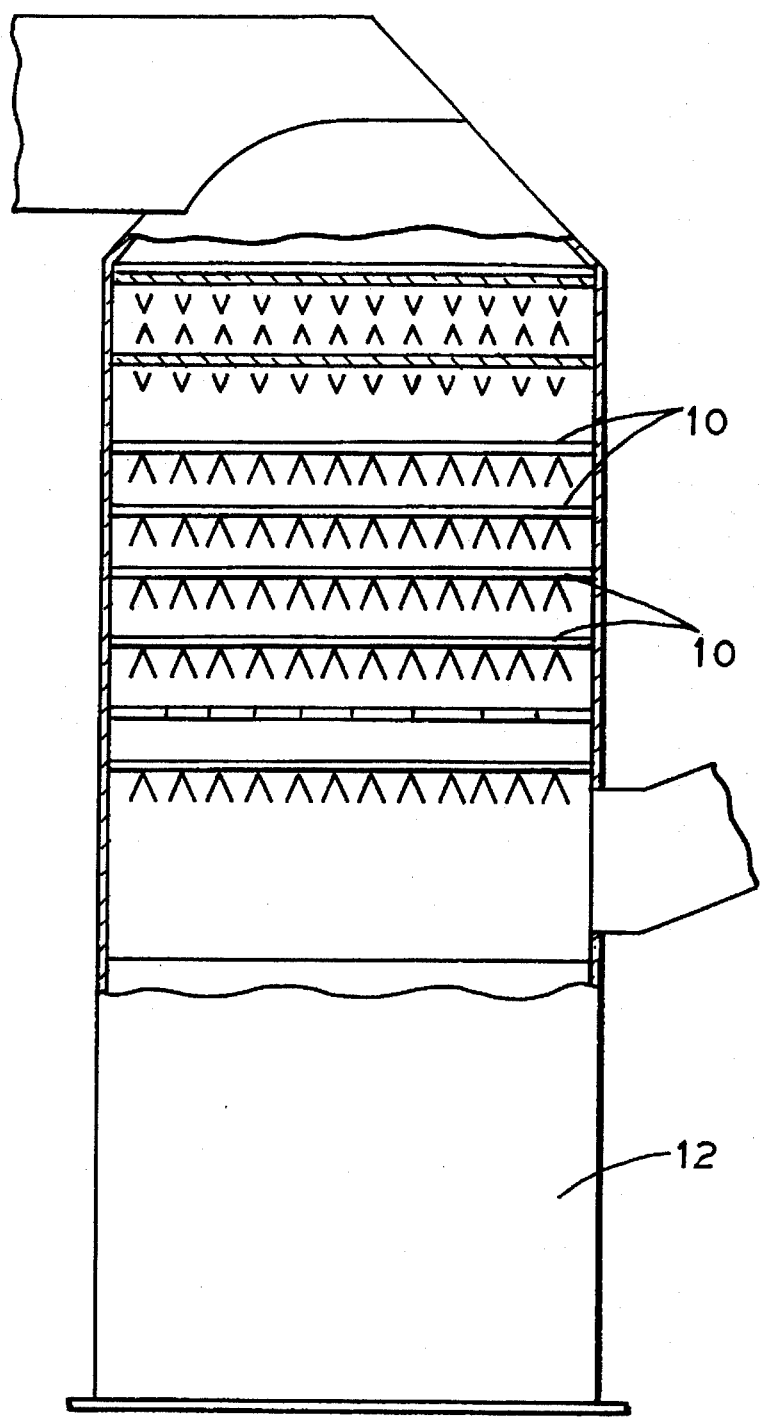
FIG. 1 is a side elevational view of a conventional flue gas desulfurization wet scrubber tower.
Figure 2:
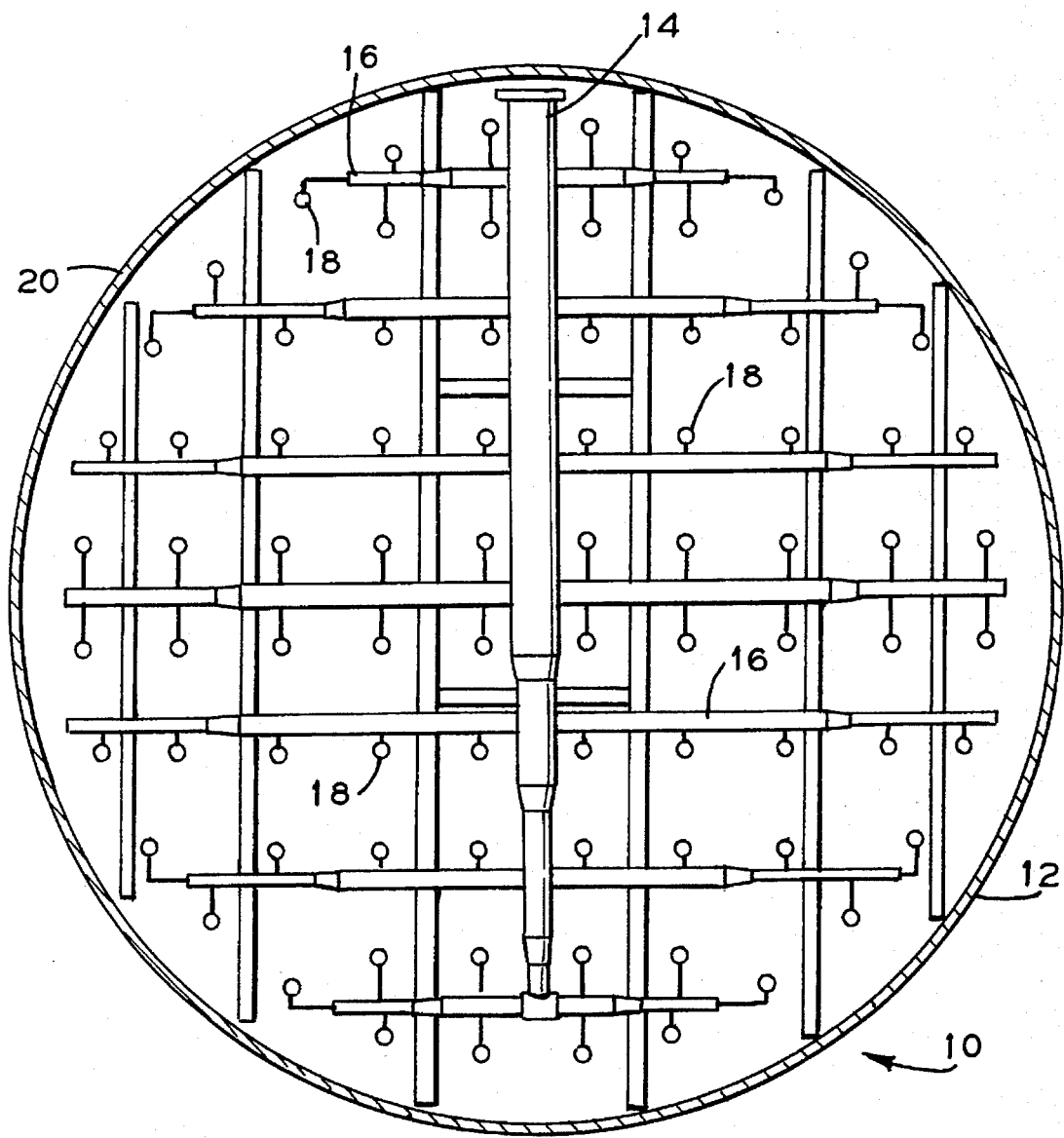
FIG. 2 is a top plan view of a conventional spray level of the scrubber tower of FIG. 1.
Figure 3:
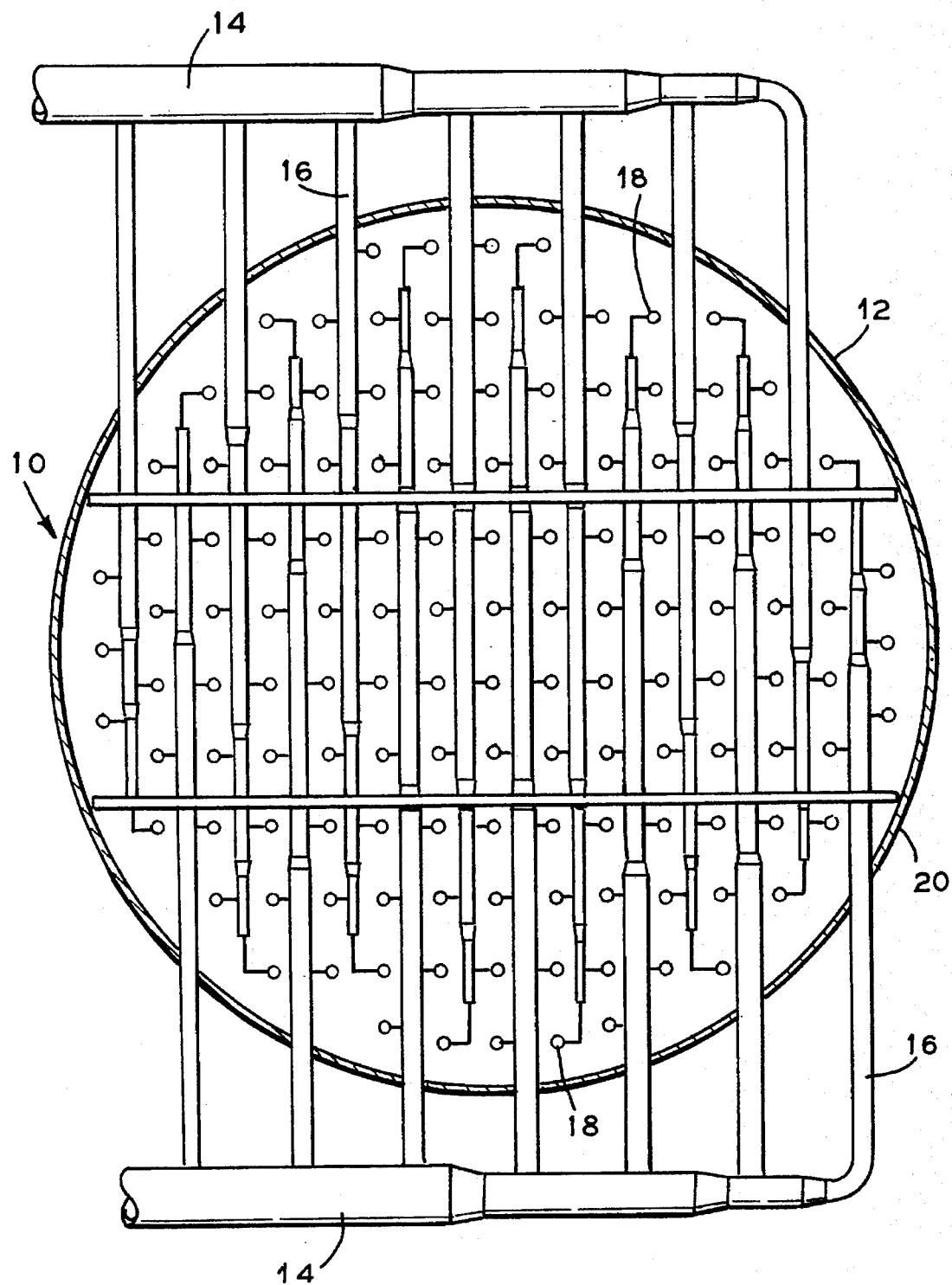
FIG. 3 is a top plan view similar to FIG. 2 of an arrangement for interspacial spray headers of a wet scrubber.

Referring initially to FIGS. 1–3, these drawings disclose previous methods of arranging spray levels 10 in a scrubber tower 12. FIG. 1 illustrates a tower 12 having a multitude of separate spray levels 10 spaced at different elevations of the tower 12. FIG. 2 is a plan view of one such typical spray level showing the arrangement of header 14 and its associated feeder lines 16. A plurality of individual spray nozzles 18 are secured to each such feeder line 16 so as to spray a reagent slurry onto the incoming flue gas. FIG. 3 illustrates an improvement of the arrangement shown in FIG. 2 in that a multitude of headers 14 and their associated feeder lines 16 spray reagent at the same level of tower 12. Unfortunately, the arrangement of FIG. 3 blocks more of the flue gas flow path within tower 12 than is blocked by the arrangement of FIG. 2. This results in a greater pressure loss across tower 12 due to the increase in blockage of the flow area. However, the arrangement of FIG. 3 enables more reagent to be sprayed onto the flue gas at each such level 10. This enables more of the contaminants in the flue gas to be removed thereby permitting a shorter tower 12 to be constructed which reduces the capital cost of tower 12.

Referring now to the invention disclosed in FIGS. 4–8, there is shown a new arrangement for uniformly distributing the reagent slurry at each spray level 10 within tower 12. This is especially adapted for the removal of sulfur from flue gases, but other contaminants can also be removed depending on the reagent sprayed onto the flue gas.

The present invention as illustrated in FIGS. 4–8 incorporates multiple main supply headers 14 which in this embodiment are located outside scrubber tower 12. However, in other embodiments, more than two such headers 14 can be utilized and these headers 14 can also be arranged within tower 12 if such is desired. Also, while headers 14 are shown as being located on opposite sides of tower 12, they can also be located along the same side of tower 12 should space limitations require such.

Referring now to FIG. 4, there is disclosed multiple parallel feeder lines or branches 16 from each supply header 14 that penetrate wall 20 of scrubber tower 12 so as to provide slurry to the individual spray nozzles 18. These feeder lines 16 from headers 14 are tightly stacked one above the other (i.e. directly over each other) in contrast to them being interwoven in a single horizontal plane as shown in FIG. 3 or in contrast to them being staggered with respect to each other. As indicated, the feeder lines 16 from one header 14 extend across the flue gas flow path in a generally parallel arrangement. Also, the feeder lines 16 from each of the headers 14 tend to be mirror images of each other in that they each extend across the flue gas flow path in a similar manner. This is so that the feeder lines 16 from one of the headers 14 will directly correspond or overlap with the feeder lines 16 from another header 14.

Figure 5:
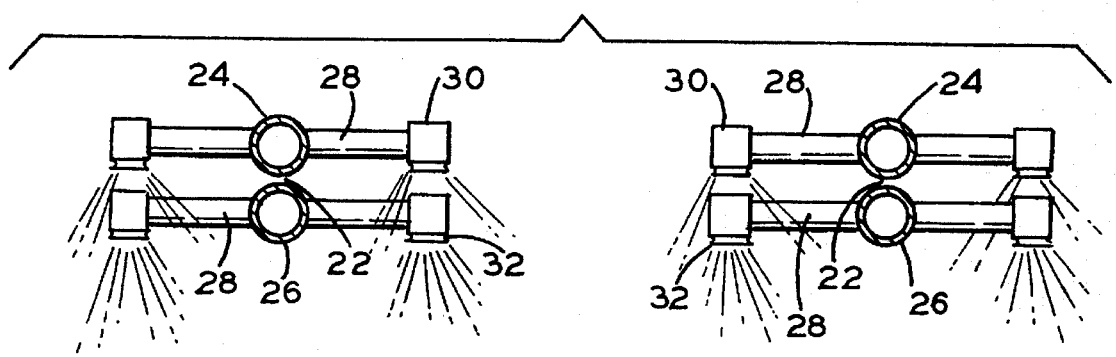
FIG. 5 is a sectional view taken along lines 5—5 of FIG. 4.
Figure 7:
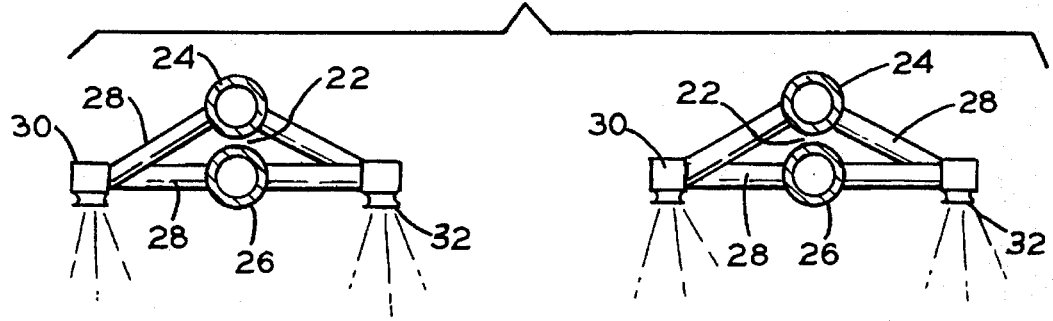
FIG. 7 is a view similar to FIG. 5 of another embodiment of the invention.

This vertically parallel, in-line arrangement of feeder lines 16 from separate headers 14 generally results in a slight gap 22 that is created between adjacent upper and lower feeder lines 24 and 26 as shown in FIGS. 5 and 7. In some cases, however, this gap 22 may actually not exist should upper feeder line 24 be in physical contact with lower feeder line 26. Alternatively, this gap 22 may be as much as the diameter of the individual headers 14 should the piping components of header 14 and feeder lines 16 require such. In any event, gap 22 is small enough so that upper and lower feeder lines 24 and 26 act as a single spray level 10 within tower 12 for pressure drop and operation purposes rather than as two separate spray levels 10 located some distance apart.

Figure 6:
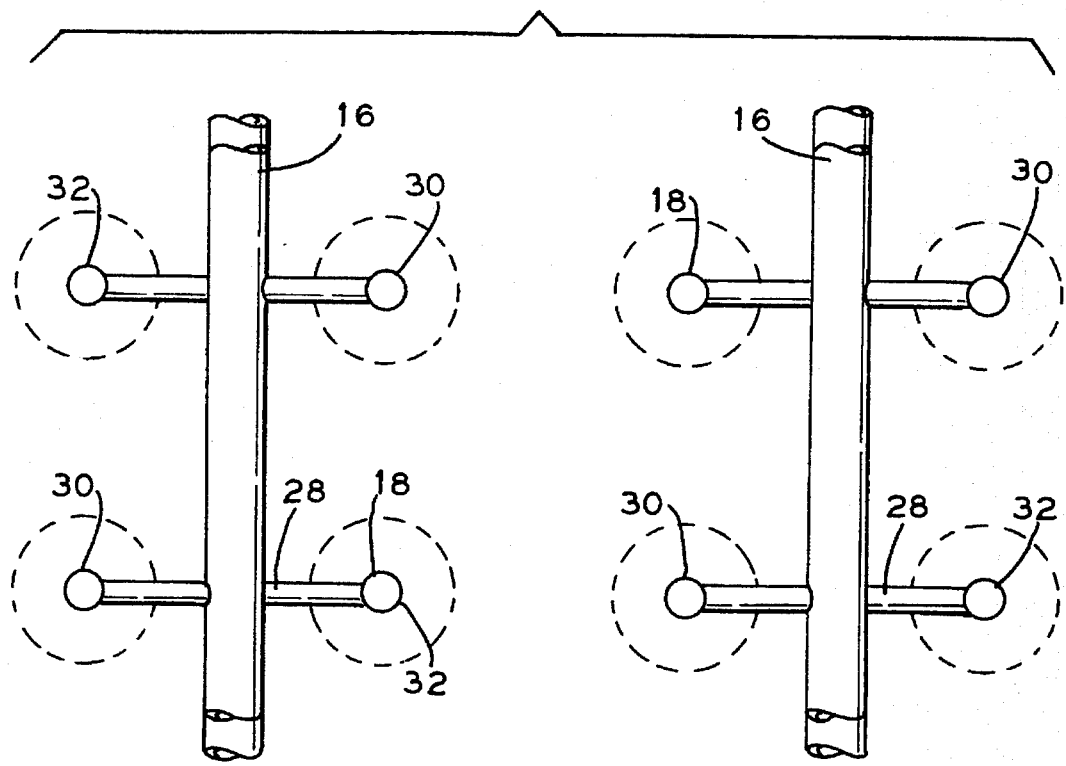
FIG. 6 is a top plan view of the nozzle arrangement shown in FIG. 5.

Referring now to FIGS. 5 and 6, the arrangement shown therein illustrates multiple horizontal connecting pipes 28 coupling the individual spray nozzles 18 to their respective feeder lines 16. Thus, upper spray nozzles 30 coupled to upper feeder lines 24 are located at an elevation slightly above that of lower spray nozzles 32 coupled to lower feeder lines 26. However, as indicated above, the actual vertical distance between such adjacent upper and lower spray nozzles 30 and 32 is very slight, if such a gap exists at all, and their effect is that both upper and lower spray nozzles 30 and 32 act as a single spray level 10.

This slight vertical stacking of matching feeder lines 16 has no consequence on the FGD process occurring within tower 12 but the design of this level 10 must avoid having upper spray nozzles 30 spraying directly on the connectors, piping or nozzles located directly therebelow. The impingement of the sprayed slurry can be very erosive which can thus eventually lead to a structural failure of one or more portions of spray level 10. Therefore, as illustrated in FIGS. 5 and 6, spray nozzles 18 are alternately staggered along the length of their respective feeder line 16 in a side-to-side manner. In this manner, the plan view of FIG. 6 illustrates full spray coverage of the flue gas flow area within tower 12 without one spray nozzle 18 being located directly above or impinging upon another. The spray nozzles 18 secured to adjacent feeder lines 16 are thus alternately staggered in a side-to-side manner with respect to each other.

Figure 8:
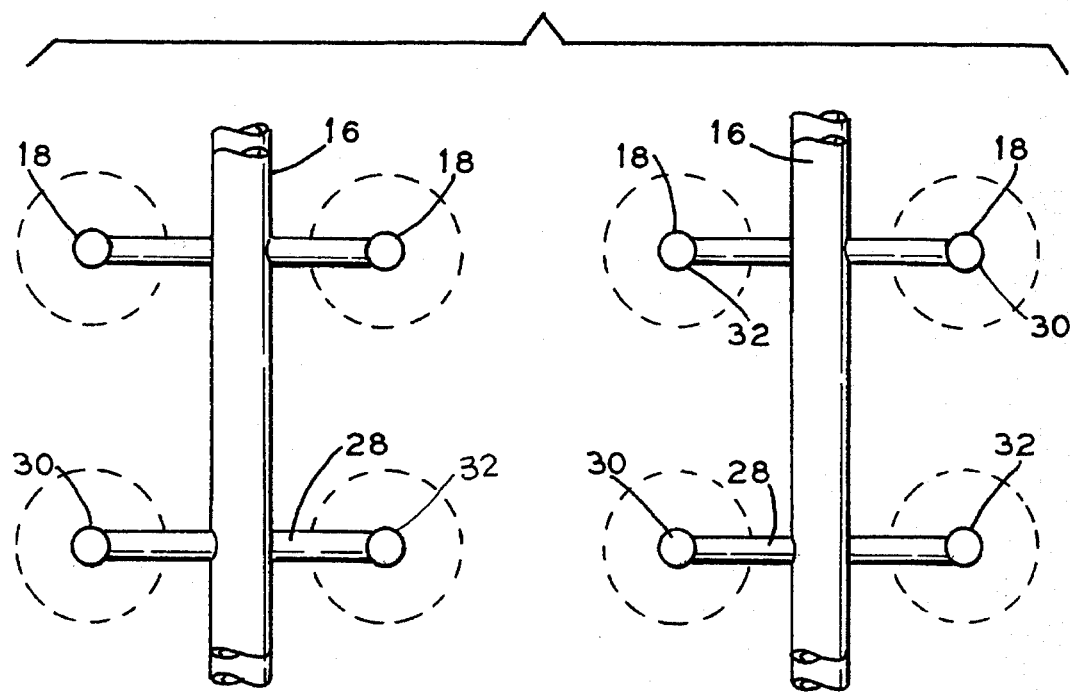
FIG. 8 is a top plan view of the nozzle arrangement shown in FIG. 7.

Referring now to the alternate embodiment illustrated in FIGS. 7 and 8, connecting pipes 28 between upper spray nozzle 30 and its associated upper feeder line 24 are inclined or angled slightly. This permits upper spray nozzle 30 to be positioned so as to spray its reagent slurry at the same, or nearly the same, level or elevation within tower 12 as lower spray nozzle 32. As indicated, this alternate embodiment provides an offset such that all spray nozzles 18 of level 10 can be located in the same or nearly the same plane. Such planer spraying of the reagent slurry is accomplished even though the respective upper and lower feeder lines 24 and 26 are not planer but instead are vertically stacked one atop or directly over the other in a parallel relationship. This arrangement may be necessary in some applications where the nozzles are closely spaced and impingement is difficult to avoid.

With feeder lines 16 from different headers 14 being located directly above each other, the 'footprint' or blockage of the flue gas flow path is reduced. The present invention blocks about 30% of the flue gas flow area. This value is higher than the blockage normally associated with conventional spray header designs shown in FIG. 2 (which have a blockage of about 22.5%). However, this invention blocks less flue gas flow area than that normally blocked by the interspacial spray header arrangement shown in FIG. 3 (which has a blockage of about 45%). It follows then that the present invention will have a higher pressure drop than conventional spray header designs but a lower pressure drop than interspacial spray header designs. It also follows that the present invention will create a higher mist eliminator loading than conventional spray header designs but a lower mist eliminator loading than interspacial spray header designs. However, as can be imagined, more reagent slurry can be sprayed onto the flue gas by the use of this invention than can be supplied via the single header of the conventional design of FIG. 2 with only a slight increase in pressure drop.

Additionally, this invention provides for a certain degree of overlap or backup should one header 14 need to be removed from operation. In the conventional design, the entire spray level 10 would be lost, but by utilizing this invention, no such loss of the spray level 10 occurs since the other header(s) associated with this spray level 10 can still function.

Also, as contrasted with conventional spray header arrangements, if the present invention were installed within tower 12 having two main supply headers 14, this would effectively double the liquid flux supplied at that level 10. Thus, the number of wet scrubber spray levels required would be half of that necessary if conventional header arrangements were used. This reduction in spray levels reduces the height of tower 12 thereby reducing material and fabrication costs.

Since the elevation of spray levels 10 and the height of scrubber tower 12 will be reduced, the slurry pumping power necessary for operation will be reduced. This will consequently reduce the capital and operating costs of the slurry recirculation pumps.

The percentage of flow area blocked by the spray header of this invention is less than the blockage normally associated with the interspacial spray header design. This reduction in blocked flow area will reduce the flue gas pressure drop which will lower the capital and operating costs of the FGD system fans.

A further consequence of a lower pressure drop is a lower flue gas velocity at each such spray level 10. Flue gas flow entrains small droplets at a rate that is proportional to gas velocity. These small droplets are eventually separated from the flue gas by mist eliminators located just before the outlet of tower 12. Reducing the velocity and the volume of the mist carried upward improves the mist eliminator efficiency, reduces mist eliminator pressure drop, and reduces mist eliminator wash requirements.

The number of spray nozzles per spray level is similar to the interspacial spray header design. Therefore, the flow and atomization characteristics of the spray nozzles are not compromised by changing the nozzle flow rate versus pressure characteristics.

A uniform spray coverage is also achieved by this invention so as to maximize the gas/liquid contact and thus increase contaminant removal and/or flue gas desulfurization. The feeder lines and nozzles that are stacked above each other are closely spaced vertically with a staggered side-to-side nozzle arrangement so as to prevent higher nozzles from impinging immediately on the lower pipes or nozzles. Furthermore, connecting pipes 28 may be angled with appropriate pipe fittings in order to locate all nozzles 18 of a spray level 10 within the same or nearly the same horizontal plane. This will provide additional spray pattern clearance that avoids impingement.

Also, one or more of the multitude of main supply headers 14 within a particular spray level 10 can be designated as a spare. Furthermore, the supply headers 14 can be fabricated using standard commercial fittings and materials such as stainless steel, lined carbon steel, or fiber reinforced plastic (FRP).

The spray header arrangement of this invention can utilize any spray nozzle configuration that is suitable for wet scrubber process requirements. Spray nozzle design parameters include slurry flow rate, pressure, spray angle, spray pattern, droplet size distribution, and internal/external geometries. Spray nozzles 18 may be oriented other than vertically downward as may be required, for example, near the tower wall 20 to avoid erosion. Also, some or all of spray nozzles 18 may spray upward with or in the same direction as the flue gas to reduce gas pressure drop and/or enhance contaminant removal.

Also, main supply headers 14 and feeder lines 16 can be tapered. A gradual progression of pipe size reductions is typically employed so as to obtain a uniform flow distribution to each spray nozzle 18 and to maintain slurry flow velocities above a minimum threshold. This minimum threshold prevents the deposition of slurry solids within the piping.

As indicated above, the present invention can also be used with four (or more) main supply headers 14 and associated pumps. Should tower 12 be configured with two such headers 14 on opposite sides thereof, the headers 14 on the same side of tower 12 can be at the same elevation or they can be vertically offset from each other while utilizing standard pipe fittings so as to obtain wall penetrations for their respective feeder lines 16. These multiple feeder lines 16 that penetrate tower 12 on each side would alternate between the two main supply headers 14. This alternative of the present invention would result in further reductions in the wet scrubber height and cost. With opposite branches being closely stacked, the flue gas pressure drop would be lower than the interspacial spray header with four main supply lines and pumps.

The invention can be incorporated into various wet scrubber tower shapes such as cylindrical (as illustrated herein), rectangular, or square. While this invention was conceived for application for a wet FGD scrubber, it can be used in any process equipment where a uniform distribution of liquid must be dispersed.

While a specific embodiment of the invention has been shown and described in detail to illustrate the application of the principles of the invention, it will be understood that the invention may be embodied otherwise without departing from such principles.

What is claimed is:

1. An arrangement for uniformly distributing a liquid slurry across a flow path at a selected level within a housing comprising:

(a) a plurality of supply headers located at the selected level of the housing, said headers supplying the liquid slurry to the housing;

(b) a plurality of feeder lines secured to each said supply header, said feeder lines extending across the flow path at this level of the housing, said feeder lines that extend across the flow path from one said supply header being vertically disposed and aligned directly atop the said feeder lines that extend across the flow path from another said supply header to reduce blockage of the flow path; and (c) a plurality of connectors coupled to each of these said feeder lines, each said connector supporting at least one spray nozzle therefrom, the said connectors coupled to one said feeder line being staggered with respect to the said connectors coupled to an adjacent vertically disposed said feeder line.

2. The arrangement of claim 1 wherein said feeder lines from one said header extend across the flow path in a generally uniformly parallel manner.

3. The arrangement of claim 1 wherein said feeder lines from each of the said plurality of supply headers extend across the flow path in a generally identical arrangement.

4. The arrangement of claim 3 wherein said supply headers and said feeder lines are tapered along their length.

5. The arrangement of claim 4 wherein said vertically disposed feeder lines define a gap therebetween, said gap having a distance of up to about the diameter of said supply header.

6. The arrangement of claim 5 wherein said connectors coupled to said feeder lines are generally co-planar with respect to their said feeder lines.

7. The arrangement of claim 6 wherein said generally co-planar connectors extend horizontally outwardly from said feeder lines.

8. The arrangement of claim 5 wherein said connectors coupled to the said feeder lines of one said supply header are outwardly and downwardly inclined with respect to said feeder lines.

9. The arrangement of claim 8 wherein said spray nozzles secured to said outwardly and downwardly inclined connectors are generally co-planar with the said spray nozzles secured to the adjacent vertically disposed said feeder lines.

10. The arrangement of claim 5 further comprising a pair of supply headers located on opposite sides of the housing.

11. A method of uniformly distributing a liquid slurry across a flow path at a selected level within a housing comprising the steps of:

(a) installing a plurality of supply headers at the level of the housing, said headers supplying the liquid slurry to the housing;

(b) securing a plurality of feeder lines to each said supply header, said feeder lines extending across the flow path at this level of the housing, said feeder lines that extend across the flow path from one said supply header being vertically disposed and aligned directly atop the said feeder lines that extend across the flow path from another said supply header to reduce blockage of the flow path; and (c) coupling a plurality of connectors to each of these said feeder lines, each said connector supporting at least one spray nozzle therefrom, the said connectors coupled to one said feeder line being staggered with respect to the said connectors coupled to an adjacent vertically disposed said feeder line.

12. The method as set forth in claim 11 further comprising the step of constructing and arranging said feeder lines from each of the said plurality of supply headers so as to extend across the flow path in a generally identical manner.

13. The method as set forth in claim 12 further comprising the step of tapering said supply headers and said feeder lines along their length.

14. The method as set forth in claim 13 further comprising the step of creating a gap between said vertically disposed feeder lines, said gap having a distance of up to about the diameter of said supply header.

15. The method as set forth in claim 14 further comprising the step of arranging said connectors coupled to said feeder lines in a generally co-planar manner with respect to their said feeder lines.

16. The method as set forth in claim 15 further comprising the step of extending said generally co-planar connectors horizontally outwardly from said feeder lines.

17. The method as set forth in claim 14 further comprising the step of outwardly and downwardly inclining said connectors coupled to the said feeder lines of one said supply header with respect to said feeder lines.

18. The method as set forth in claim 17 further comprising the step of arranging said spray nozzles secured to said outwardly and downwardly inclined connectors in a generally co-planar manner with respect to the said spray nozzles secured to the adjacent vertically disposed said feeder lines.

19. The method as set forth in claim 14 further comprising the step of locating a pair of supply headers on opposite sides of the housing.

20. The arrangement of claim 1, wherein said housing is adapted to receive a flue gas moving in the flow path, each spray nozzle of said plurality of connectors facing the same direction for spraying liquid slurry in the same direction and parallel to the flow path.

21. The method of claim 11, wherein said housing is adapted to receive a flue gas moving in the flow path, each spray nozzle of said plurality of connectors facing the same direction for spraying liquid slurry in the same direction and parallel to the flow path.

* * * * *